United States Patent [19]

Vollmer et al.

[11] 4,241,935
[45] Dec. 30, 1980

[54] COUPLING HOOK STRUCTURE FOR TRACTOR HITCH SYSTEM

[75] Inventors: Jürgen Vollmer, Lohmar; Norbert Müller, Ruppichteroth-Schönenberg, both of Fed. Rep. of Germany

[73] Assignee: Jean Walterscheid GmbH, Lohmar, Fed. Rep. of Germany

[21] Appl. No.: 58,538

[22] Filed: Jul. 18, 1979

[30] Foreign Application Priority Data

Jul. 20, 1978 [DE] Fed. Rep. of Germany ....... 2831862

[51] Int. Cl.³ ............................................. B60D 1/12
[52] U.S. Cl. ................................ 280/461 A; 172/272; 172/439; 280/504
[58] Field of Search ............... 280/460 A, 461 A, 504, 280/508, 510, 482, 456 A; 172/272, 439

[56] References Cited

U.S. PATENT DOCUMENTS

| | | | |
|---|---|---|---|
| 3,361,447 | 1/1968 | Engelmann | 280/504 |
| 3,384,937 | 5/1968 | Muncke et al. | 280/461 A |
| 3,544,133 | 12/1970 | Lemmon et al. | 172/272 |

FOREIGN PATENT DOCUMENTS

| | | |
|---|---|---|
| 1457705 | 8/1969 | Fed. Rep. of Germany. |
| 1937764 | 2/1971 | Fed. Rep. of Germany. |
| 444557 | 2/1968 | Switzerland ............... 172/272 |

*Primary Examiner*—John P. Silverstrim
*Assistant Examiner*—Donn McGiehan
*Attorney, Agent, or Firm*—Toren, McGeady and Stanger

[57] ABSTRACT

A three-point tractor hitch system includes a coupling hook structure as the upper link thereof formed with a hook body defining a concave recess for receiving therein in locking engagement a coupling sphere. A locking bolt received within a rectilinear opening extends into the concave recess of the hook body with a curved locking surface adapted to engage the contour of the coupling sphere. The locking bolt is pivotally mounted at its opposite end to a control lever having a generally U-shaped recess formed therein to engage a bearing pin mounted on the hook body. The U-shaped recess has lateral sides arranged so that imaginary extensions thereof will intersect the axis of the locking bolt and bearing means are interposed between the control lever and the hook body on a side of the pivotal coupling of the locking bolt to the hook body opposite the side on which the U-shaped recess is formed. A bearing pin is located on the hook body to be engaged within the U-shaped recess of the control lever when the locking bolt extends into its locking position within the concave recess.

2 Claims, 2 Drawing Figures

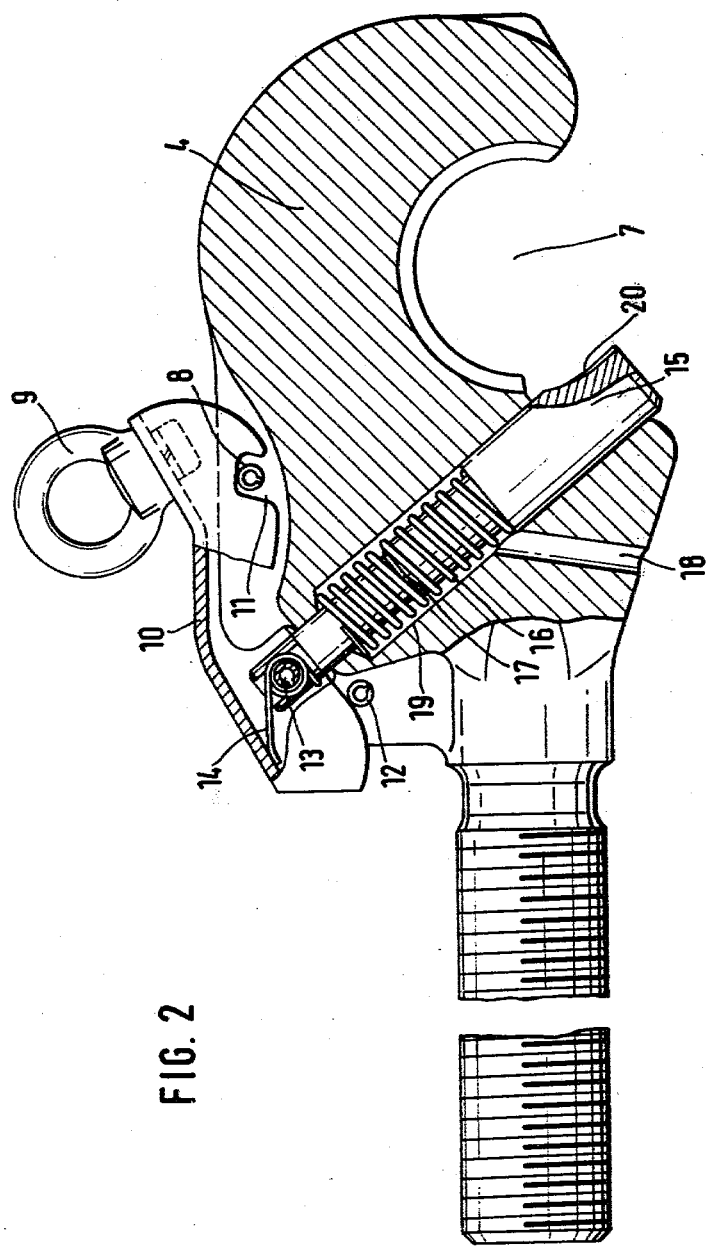

COUPLING HOOK STRUCTURE FOR TRACTOR HITCH SYSTEM

BACKGROUND OF THE INVENTION

The present invention is generally related to hitch mechanisms for tractors and more particularly to the structure of a coupling hook which is the upper link of a three-point linkage system for a tractor hitch.

A hook of the type to which the present invention relates normally includes a hook body defining a concave recess adapted to receive in locking engagement therein a catch ball or a coupling sphere connected with the coupling pin of an implement which is to be connected or hitched to the tractor. Such devices usually include a spring loaded locking bolt which protrudes through a rectilinear opening into the recess of the coupling hook with a curved surface adapted to engage the coupling sphere. The locking bolt may be pivotally connected with a control lever at its end remote from the end extending into the hook recess with stop means being provided to limit the movement of the locking bolt in the disengaging direction of the hook structure.

Coupling hooks for receiving coupling spheres attached upon a coupling pin of a hitch system for an implement to be mounted upon a tractor are generally known. In such devices the spring-loaded locking bolt protruding with its curved locking surface into the hook recess is adapted to the radius of the ball or coupling sphere, as will be known from prior German Pat. No. 1 457 705. In such prior art devices, the object is to facilitate coupling and uncoupling of an upper coupling pin at the implement end of the tractor from the driver's seat so that coupling and uncoupling of an implement may be provided in a simplified operation. In such a device, the tension medium for the closing member of the hook and the tension medium for the catch for the longitudinal adjustment of the upper link are joined with each other.

In a further development of devices in accordance with the invention, the catch is provided with a lever designed together with the lever of the closing member of the hook as a two-arm lever where the fulcrums of the two levers are arranged close together and where the free ends of the levers are joined with each other by a traction-transmitting member.

A disadvantage of prior art devices is that a single control element is provided for the common control mechanism in order to secure the longitudinal adjustment of the upper link and for unlocking of the coupling hook, and as a result maneuverability of the upper link is impaired. In many cases it becomes necessary to change the length of the upper link with the coupling hook locked. This can be desirable, for example, in order to vary the working depth of an attached implement such as a plow.

However, in a connection of the two locking means for the longitudinal adjustment of the upper guide rod and for the coupling hook, there is a risk that during adjustment of the length of the upper link the coupling hook will become unlocked and the mounted implement will drop out of the upper hook or link. This would cause, apart from an increased risk of accident, the necessity for once again attaching the entire upper coupling point.

A further disadvantage of previously known devices involving coupling hooks of the type discussed is that the lock of the catch ball in the coupling mouth can open by rotation of the catch ball caused by tilting movements of the mounted implement due to frictional forces acting on the locking bolt.

Further suggestions of the prior art provide for a coupling hook to prevent accidental unlocking by tilting movements of the mounted implement, as will be seen from German Pat. No. 1 937 764. The coupling hook underlying this device is equipped with a safety bolt wherein there is provided a longitudinal bore, with a safety pin being loaded with a compression spring arranged within the longitudinal bore and with a device locking the axial displacement acting on the safety bolt in a locking position so that the locking device is unlocked when the safety pin is withdrawn.

Locking and unlocking of a safety bolt is effected by one or more locking balls which block the safety bolt against axial displacement relative to the housing of the coupling hook when in the locked position, and also relative to the safety pin in the unlocked position.

The coupling hook mechanism represented by the foregoing usually has a form-locking safety feature against accidental opening of the coupling hook but it is generally extremely elaborate due to the great number of moving parts which must move relative to each other and which are held within narrowly fitting elements.

In addition to the foregoing, coupling hooks of the prior art may be highly susceptible to functional difficulties because the elaborate mechanism will have its freedom of movement impaired by dirt or deleterious objects entering the parts of the mechanism.

The present invention is directed toward providing a coupling hook structure for the upper link of a tractor coupling system which receives the catch ball or coupling sphere of the implement to be coupled with the tractor and which is provided with substantial safety features against accidental unlocking, which consists of relatively few moving parts and which is generally insensitive to penetration by dirt or other contaminants.

SUMMARY OF THE INVENTION

Briefly, the present invention may be defined as a coupling hook structure forming the upper link of a three-point linkage system for a tractor hitch adapted to receive in locking engagement the coupling sphere of a coupling pin of an implement to be attached to the tractor by said three-point linkage system, said coupling hook structure comprising a hooked body defining a concave recess for receiving a coupling sphere in locking engagement therein, means defining through said hooked body a rectilinear opening extending to said concave recess, a locking bolt received within said rectilinear opening and having one end adapted to extend into said recess for locking engagement with a coupling sphere received within said recess, said one end being formed with a curved locking surface adapted to the contour of said coupling sphere, spring means operatively engaging said locking bolt, a control lever having pivotally coupled thereto an end of said locking bolt opposite said one end thereof, stop means limiting movement of said locking bolt within said rectilinear opening, a generally U-shaped recess formed in said control lever at a point thereon spaced from said pivot coupling of said locking bolt opposite end and opening toward said concave recess, said U-shaped recess being defined by lateral sides which are arranged such that imaginary extensions thereof intersect the axis of said locking bolt, a bearing pin on said hook body located to be engaged within said U-shaped recess when said locking bolt extends into locking position into said concave recess and bearing means interposed between said control lever and said hook body on a side of said pivotal coupling of said locking bolt to said control lever opposite the side on which said U-shaped recess is located.

The advantages of the present invention derive in that the control lever is provided at its end remote from the pivotal coupling with the locking bolt with at least one U-shaped recess which opens toward the coupling hook so that the imaginary extension of the lateral boundaries of the recess remote from the locking bolt intersect the axis of the locking bolt and so that a bearing pin will be so arranged on the side of the coupling hook opposite the hook mouth that the recess overlaps the bearing pin in the locking state.

A particular advantage of the coupling hook in accordance with the invention resides in the fact that only two parts moving toward or with each other are provided, namely a locking bolt and a control lever having the latter hinged thereto. It is particularly expedient that the locking mechanism itself is arranged outside the coupling hook on its top side and thus any dirt deposited on the mechanism which would impair safety of the lock may be easily seen and removed. Beyond this, an operator may readily check at a glance whether the lock of the locking bolt is properly engaged.

A further advantage of the design of the coupling hook in accordance with the invention is that the idle paths during opening of the coupling hook are to a great extent avoided. If the coupling hook is unlocked by tension on the traction eye of the control lever, the locking bolt starts to withdraw simultaneously with such unlocking action.

The process of unlocking the device is therefore not impaired by the very narrow free space between the tractor and the implement mounted thereon.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there is illustrated and described a preferred embodiment of the invention.

DESCRIPTION OF THE DRAWINGS

In the drawings:

FIG. 2 is a partial sectional view taken through the coupling hook of FIG. 1.

DETAILED DESCRIPTION OF THE PREFERRED EMBODIMENT

Figure 1:
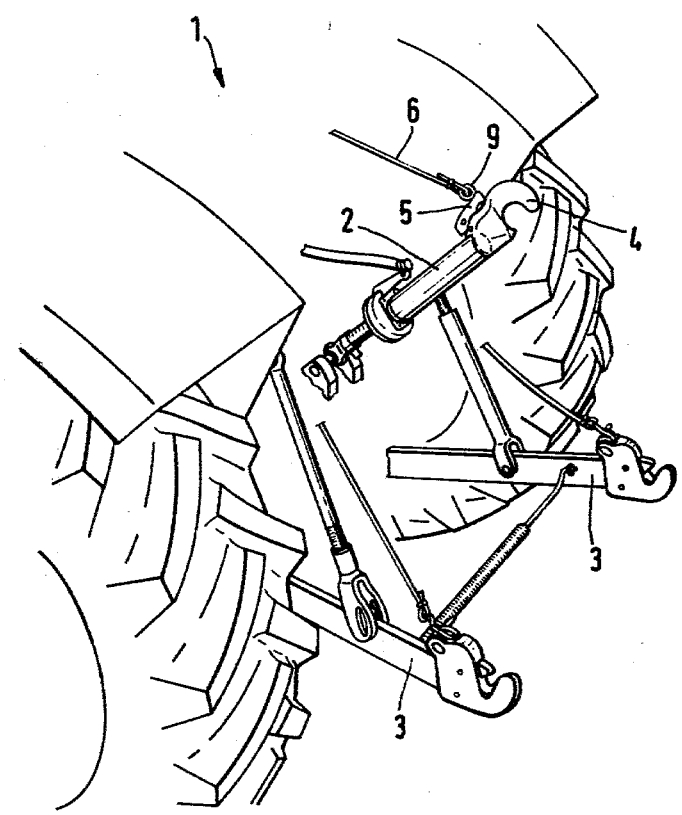
FIG. 1 is a perspective view showing a three-point linkage system arranged on the rear of a tractor having a coupling hook structured in accordance with the present invention as its upper link.

As will be seen from FIG. 1, a three-point linkage system attached to the rear of a tractor 1 includes a link 2 hinged to the tractor and having arranged at its opposite end a coupling hook 4. The link 2 forms the upper link of the three-point linkage system and cooperates with lower links 3 for receiving in coupling engagement an implement to be attached to the rear of the tractor. The coupling hook 4 may be unlocked by means of a traction rope 6 attached to a coupling eye 9 connected with a control lever 5.

The coupling hook 4 consists of a coupling mouth 7 which essentially comprises a concave recess defined by the hook body of the hook 4 into which a locking sphere or catch ball may be received in locking engagement. A locking bolt 15 protrudes from a bore 19 formed to extend through the hook body 4 into the coupling mouth 7. At its end protruding into the coupling mouth 7, the locking bolt 15 is provided with a curved locking surface 20 which is adapted to the diameter of the coupling sphere which is to be mounted in locking engagement therein.

The locking bolt 15 is biased in the locking direction toward the recess 7 by a locking spring 16 which bears with one end thereof upon the shoulder of the bore 19 and with its other end on a shoulder of the locking bolt 15.

A shoulder or stop member 17 is provided on the locking bolt 15 in order to prevent compression of the spring over the length of the bolt.

A second bore 18 extending at an angle with the bore 19 serves to enable removal of dirt, water of condensation or other contaminants from within the hook structure.

The locking bolt 15 is connected to a control lever 10 by a hinged joint 13 in a manner which will permit pivotal movement of the lever 10 relative to the bolt 15 at the hinged joint 13. At one end of the lever 10 on the side spaced from the pivotal or hinged joint 13 there is provided bearing means in the form of an abutment 12 which bears against a surface of the control lever 10 so that with rotating movement of the control lever 10 its end will bear against the abutment 12 thereby enabling the control lever 10 to pull the locking bolt 15 out of locking position in the recess 7 of the coupling hook 4. The force of the locking spring 16, on the one hand, and the distance of the abutment 12 from the axis of the locking bolt 15, as well as the effective distance of the coupling eye 9 from the axis of the locking bolt 15 must be so adapted relative to each other that, when the entire weight of the upper link 2 including the coupling hook 4 hangs upon the traction rope 6 arranged in the coupling eye 9, the locking bolt 15 will be maintained in its unlocked position withdrawn from the recess 7.

It is thus possible for the driver of the tractor to easily maintain the coupling hook in the unlocked position in a relatively simple manner and to readily engage within the hook 4 a coupling sphere mounted on an implement which is to be coupled with the tractor. The locking of the spherical coupling ball in the recess 7 of the coupling hook 4 may be effected by simply releasing the traction rope 6 after which the locking bolt 15 will be caused to move into the coupling recess 7 under the action of the locking spring 16. The catch ball or coupling sphere (not shown) will thus be locked in engagement within the recess 7.

A U-shaped recess 11 is provided in the control lever 10 at an end thereof on one side of the hinged joint 13, opposite the side in which the bearing means including the abutment 12 are provided. The U-shaped recess 11 is arranged to engage therein in the locking state of the hook system a bearing pin 8 which is fixed on the top side of the body of the coupling hook 4. The recess 11 is provided with lateral boundary sides which extend in a direction such that imaginary extensions of the lateral boundary sides of the recess 11 will intersect the axis of the locking bolt 15.

Thus, it will be found that two criteria will be applicable with regard to the hinged joint 13 of the locking bolt 15 connecting the bolt 15 with the control lever 10 when in the locked state, with these criteria positively preventing accidental opening of the locking bolt because of tilting movement, for example of an attached implement. First, because of its connection with the locking bolt 15, the hinged joint 13 can only perform a linear translatory movement in the direction along the axis of the locking bolt. On the other side, due to its fastening with the control lever 10 and its operative connection with the bearing pin 8 over the lateral boundary of the U-shaped recess 11, the hinged joint 13 can only perform a circular or curved movement about the bearing pin 8.

Since the two motion characteristics involved will contradict each other, the coupling hook 4 will be positively protected against accidental opening. In order to improve the support or the mounting of the control lever 10 on the bearing pin 8, an auxiliary spring 14 acting in the closing direction may be provided in connection with the hinged joint 13.

While a specific embodiment of the invention has been shown and described in detail to illustrate the application of the inventive principles, it will be understood that the invention may be embodied otherwise without departing from such principles.

What is claimed is:

1. A coupling hook structure forming the upper link of a three-point linkage system for a trailer hitch adapted to receive in locking engagement therewith the coupling sphere of a coupling pin of an implement to be attached to said tractor by said three-point linkage system, said coupling hook structure comprising: a hook body defining a concave recess for receiving a coupling sphere in locking engagement therein; means defining through said hook body a rectilinear opening extending to said concave recess; a locking bolt received within said rectilinear opening and having one end adapted to extend into said recess for locking engagement with a coupling sphere received within said recess, said one end being formed with a curved locking surface adapted to the contour of said coupling sphere; spring means operatively engaging said locking bolt; a control lever having said locking bolt pivotally coupled thereto at an end of said locking bolt opposite said one end; stop means limiting movement of said locking bolt within said rectilinear opening; a generally U-shaped recess formed in said control lever at a point thereon spaced from said pivotal coupling of said locking bolt with said control lever and opening toward said concave recess, said U-shaped recess being defined by lateral sides which are arranged such that imaginary extensions thereof intersect the axis of said locking bolt; a bearing pin on said hook body located to be engaged within said U-shaped recess when said locking bolt extends into locking position into said concave recess; and bearing means interposed between said control lever and said hook body on the side of said pivotal coupling opposite the side thereof on which said U-shaped recess is formed.

2. A coupling hook structure according to claim 1 wherein said bearing means comprise an abutment member affixed with said hook body and a cam-like surface on said control lever arranged for sliding engagement with said abutment member to permit loose pivotal movement of said control lever about said abutment member in order to draw said lock bolt out of said rectilinear opening away from said concave recess, with said U-shaped recess moving out of engagement with said bearing pin.

* * * * *